June 6, 1933. W. J. MORRILL 1,913,208
REVERSIBLE MOTOR
Filed Feb. 9, 1932

Inventor:
Wayne J. Morrill,
by Charles E. Tullar
His Attorney.

Patented June 6, 1933

1,913,208

UNITED STATES PATENT OFFICE

WAYNE J. MORRILL, OF FORT WAYNE, INDIANA, ASSIGNOR TO GENERAL ELECTRIC COMPANY, A CORPORATION OF NEW YORK

REVERSIBLE MOTOR

Application filed February 9, 1932. Serial No. 591,777.

My invention relates to alternating current motors which may be reversed, and its object is to provide an inexpensive simple motor of this type. In carrying my invention into effect, I employ a motor of the single phase split phase variety in which the starting winding is energized from the main primary winding through transformer action, with provision whereby the relative direction of phase rotation of the fluxes of the two windings may be reversed and the starting winding cut out of circuit after the motor is started, if that is desirable.

Figure 1:
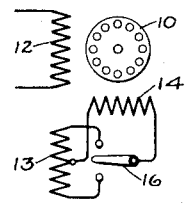
Figure 2:
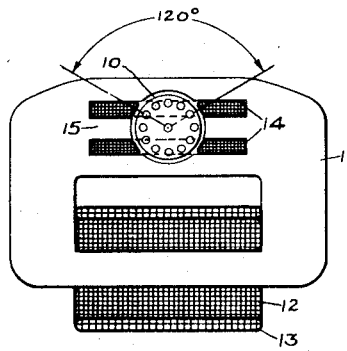
Figure 3:
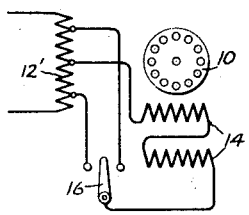
Figure 4:
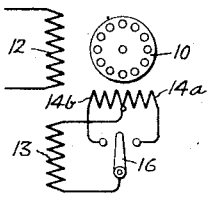

The features of my invention which are believed to be novel and patentable will be pointed out in the claims appended hereto. For a better understanding of the invention, reference is made in the following description to the accompanying drawing. Fig. 1 shows the circuit arrangement of the motor using separate primary and secondary windings in the transformer of the motor; Fig. 2 shows an end view of such a motor with the windings in section to illustrate the preferred assembly arrangement; Fig. 3 is a circuit arrangement of the motor where the primary winding is used as an auto-transformer; and Fig. 4 illustrates a modification where separate starting windings for the different directions of rotation are employed.

Referring to Fig. 2, the motor as here represented consists of a squirrel cage induction secondary rotor member 10 and the single phase stator member 11, the magnetic circuit of which embraces the secondary. The primary winding of the stator is represented at 12. This winding serves two purposes, namely, to produce the main flux through the rotor, and as the primary of a transformer, the secondary of which is represented at 13. This transformer serves to supply current to a quadrature winding 14 surrounding the rotor. The quadrature winding is preferably wound in two sections connected in series and placed in the pole pieces adjacent the rotor. The two sections are separated, leaving a flux path 15 between them. The main flux thus enters and leaves the rotor in three parallel paths. This arrangement reduces the reactance of the quadrature winding and leaves room for the rotor shaft to extend between the two sections. Preferably, the angle of pitch for each section of the auxiliary winding is about 120 degrees. The electrical connections are represented in Fig. 1.

The resistance of the auxiliary winding 14 is very high as compared to its reactance, so that the flux produced thereby through the rotor is approximately 90 degrees displaced in phase from that produced by the main winding 12, and as a result the two fluxes produce the necessary rotating magnetic field to start and operate the motor. The flux leakage around the rotor due to the magnetic connections between the pole pieces is believed to be beneficial in obtaining the correct phase angle between the rotor fluxes.

The secondary voltage of the transformer is preferably low, so that only low voltages are encountered in the secondary circuit.

It will be noted from Fig. 1 that one end of the auxiliary winding 14 is permanently connected to the midpoint of the secondary winding 13, and the other end of winding 14 is connected to a single pole double throw switch 16, the stationary contacts of which are connected to the opposite ends of secondary winding 13. It will now be seen that by changing the connections afforded by switch 16, the current in the auxiliary winding 14 may be reversed. This reverses the phase relation of its flux with respect to that of the main motor flux, and reverses the flux phase rotation and direction of motor operation.

In very small fractional horse power motors the resistance of the rotor secondary winding 10 will be very high, and under these conditions the motor will not operate, even after being started, if the auxiliary circuit is opened. The low voltage switch 16 thus serves as a control switch for starting, stopping, and reversing the motor. Should it become desirable to provide a motor with a low resistance secondary such that the motor will operate single phase after being started, the switch 16 may then serve not only to control and reverse the motor, but may be used to cut the auxiliary winding out of circuit after starting, if that is desirable for any reason.

By proper design, some speed control could be afforded by opening and closing switch 16 after the motor is in operation. The motor, aside from its reversing feature, has been found to have very excellent series characteristics using the auxiliary winding in operation with a high resistance rotor.

Fig. 3 represents a wiring diagram for the same type of motor, but with the main motor winding 12' used as an auto-transformer, thereby saving the expense of the extra secondary winding 13 of Figs. 1 and 2.

While I have shown an ordinary squirrel cage induction rotor, the invention is not limited to the type of rotor used. The rotor may, for example, be provided with salient poles, or otherwise constructed for synchronous operation.

In some localities there are regulations with respect to short-circuit input to electrical apparatus used with bell wiring to prevent fire hazard, and where such regulations and conditions exist the modification of the invention represented in Fig. 4 may be desirable. In Fig. 4, two quadrature or auxiliary windings 14a and 14b are provided. The transformer secondary windings 13 supply windings 14a for one direction of rotation, and 14b for the opposite direction of rotation, through the double throw single pole reversing switch 16. The auto-transformer arrangement shown in Fig. 3 may also be used. It will be evident that the arrangement shown in Fig. 4 is electrically equivalent to the arrangements previously described so far as the motor operation is concerned. The pair of windings 14a and 14b will preferably each be distributed as explained for the two-section winding 14 of Fig. 2.

The advantage of the arrangement of Fig. 4 from the standpoint of safety is explained as follows: If in Fig. 1 or Fig. 3 the three terminals of the control switch should become accidentally short-circuited it would provide a direct short-circuit of the transformer secondary, resulting in a dangerously heavy current input to the motor and a fire hazard either in the motor windings themselves or in the circuit connected thereto.

If the same thing happened in Fig. 4, the transformer secondary would merely be connected in parallel with both auxiliary quadrature windings at once, and since these windings are of quite high resistance no dangerously high current input to the motor will result.

What I claim as new and desire to secure by Letters Patent of the United States is:—

1. An alternating current motor having relatively rotatable primary and secondary members, the primary member having a magnetic circuit embracing the secondary member and excited by a single phase primary winding, an auxiliary winding for producing a flux through the secondary in quadrature with respect to the flux produced therethrough by the main winding, said auxiliary winding being excited from the main winding by transformer action, and means for reversing the current in the auxiliary winding with respect to that in the primary winding for reversing the motor.

2. An alternating current motor having relatively rotatable primary and secondary members, the primary member having a magnetic circuit embracing the secondary member, a single phase primary winding for exciting said magnetic circuit and producing the main flux through the secondary member, an auxiliary winding for producing a flux through the secondary member in quadrature to that produced by the primary winding, said auxiliary winding being divided into two sections which are located on the primary magnetic circuit so as to divide the main flux into three paths as it enters and leaves the secondary member, and means for energizing said auxiliary winding from the primary winding by transformer action.

3. An alternating current motor having relatively rotatable primary and secondary members, the primary having a magnetic circuit with a pair of poles embracing the secondary member, a single phase primary winding for producing the main flux through the magnetic circuit and secondary member, an auxiliary winding having two sections located in the pole faces of the primary magnetic circuit for producing a flux through the secondary member at right angles to the main flux therethrough, each section of said auxiliary winding having a pitch of approximately 120 degrees, said auxiliary winding sections dividing the path of the main flux as it enters and leaves the secondary into three parallel paths, and means for energizing said auxiliary winding by transformer action from the primary winding, the resistance of the auxiliary winding circuit being sufficiently high as compared to its reactance that the flux produced thereby is approximately 90 degrees displaced in phase from the main flux.

4. An alternating current motor comprising a primary stator member and an induction secondary rotor member, the primary member having a bi-polar magnetic circuit embracing the rotor, a single phase winding on the primary member for producing the main flux through the rotor, an auxiliary winding in the pole pieces of the primary member for producing a flux through the rotor at right angles to the main flux therethrough, a transformer on said stator member including the aforesaid single phase winding as its primary, connections for energizing the auxiliary winding from said transformer, including control means for reversing the current in the auxiliary winding with respect to that in the single phase winding and thereby reversing the motor, said auxiliary winding having a sufficiently high resistance with respect to its reactance that the flux produced thereby is approximately 90 degrees displaced in phase from the main motor flux.

5. A reversible alternating current motor comprising a stator primary member and a squirrel cage secondary rotor member, the primary member having a bi-polar magnetic circuit for producing fluxes through the rotor, a single phase primary winding on said magnetic circuit for producing the main motor flux, an auxiliary winding in the pole pieces of the stator for producing a flux through the rotor at right angles to the main flux, a transformer on said stator, including said single phase winding, a central secondary tap on said transformer connected to one end of the auxiliary winding, a double throw, single pole switch, the movable member of which is connected to the outer end of said auxiliary winding, and secondary transformer taps on opposite sides of said central tap connected to the stationary contacts of said switch.

6. An alternating current motor having relatively rotatable primary and secondary member, the primary member having a magnetic circuit embracing the secondary member, a single phase primary winding for exciting said magnetic circuit and producing the main flux through the secondary member, a pair of auxiliary windings for producing fluxes through the secondary member in quadrature to the main flux therethrough, and means for alternately energizing said auxiliary windings from the primary winding by transformer action so as to reverse the direction of the quadrature flux and the direction of rotation of the motor.

In witness whereof, I have hereunto set my hand.

WAYNE J. MORRILL.